Oct. 5, 1943.  G. B. WHITE  2,330,852
PALLET
Filed April 28, 1941  3 Sheets-Sheet 1
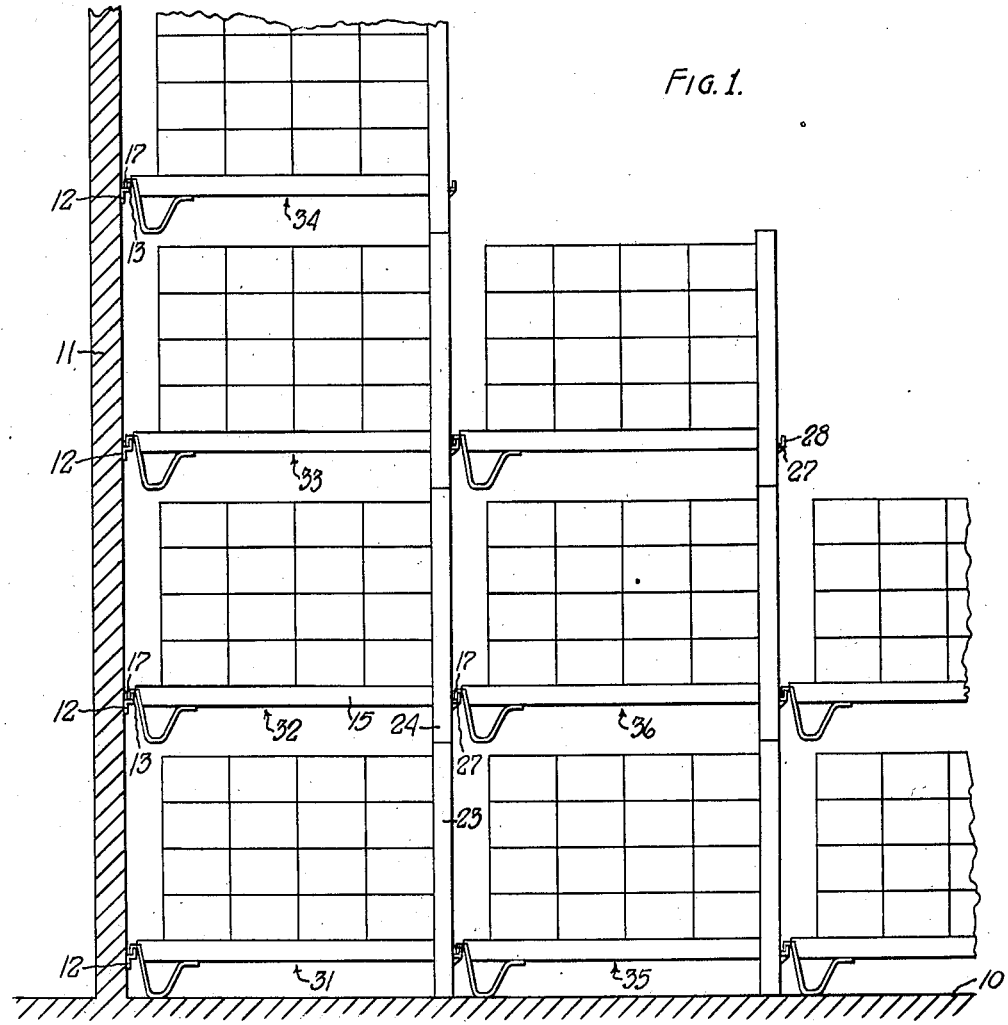
FIG. 1.
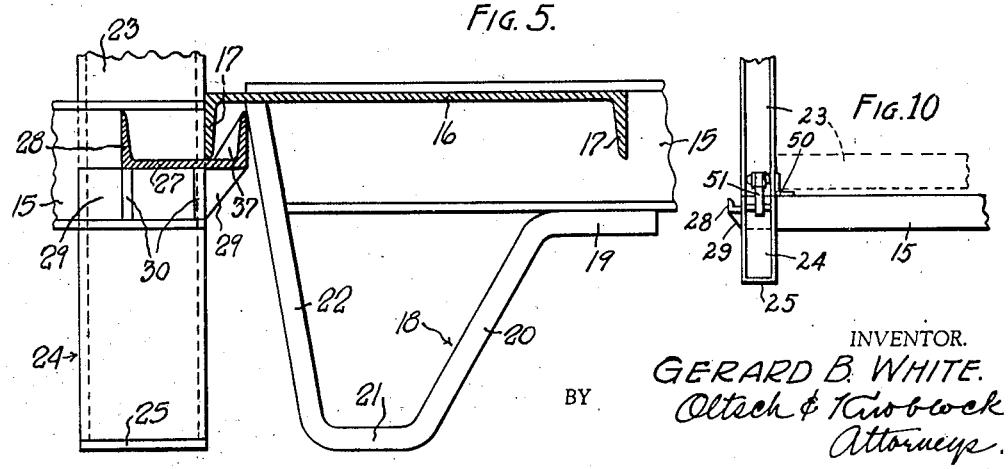
FIG. 5.
FIG. 10
INVENTOR.
GERARD B. WHITE.
Oltsch & Knoblock
BY Attorneys.

Oct. 5, 1943.   G. B. WHITE   2,330,852
PALLET
Filed April 28, 1941   3 Sheets-Sheet 2

INVENTOR.
GERARD B. WHITE.
BY Oltsch & Knoblock
Attorneys.

Oct. 5, 1943. G. B. WHITE 2,330,852
PALLET
Filed April 28, 1941 3 Sheets-Sheet 3
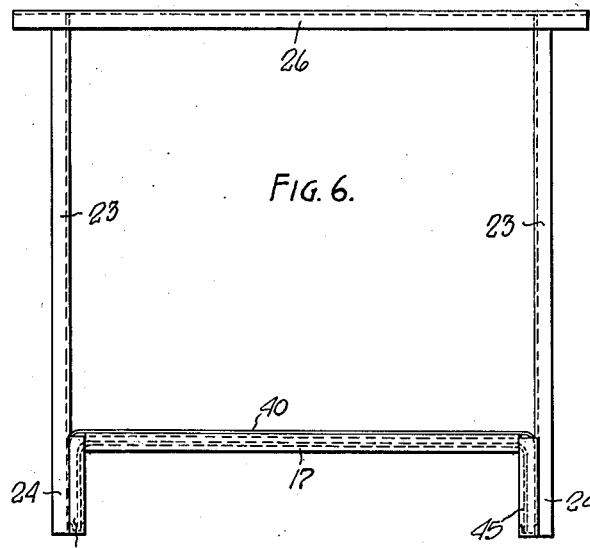
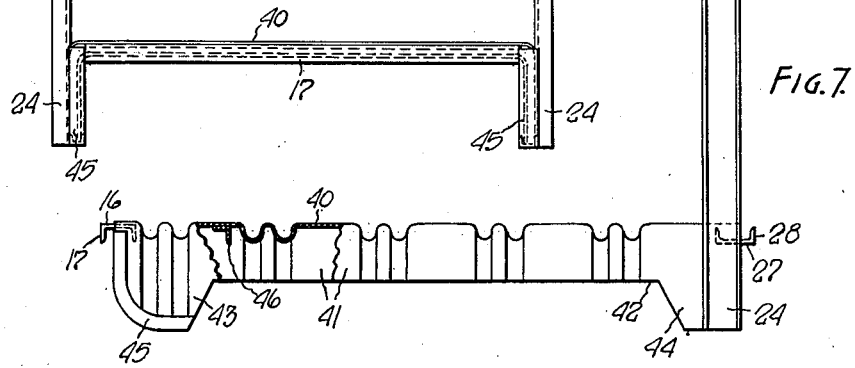
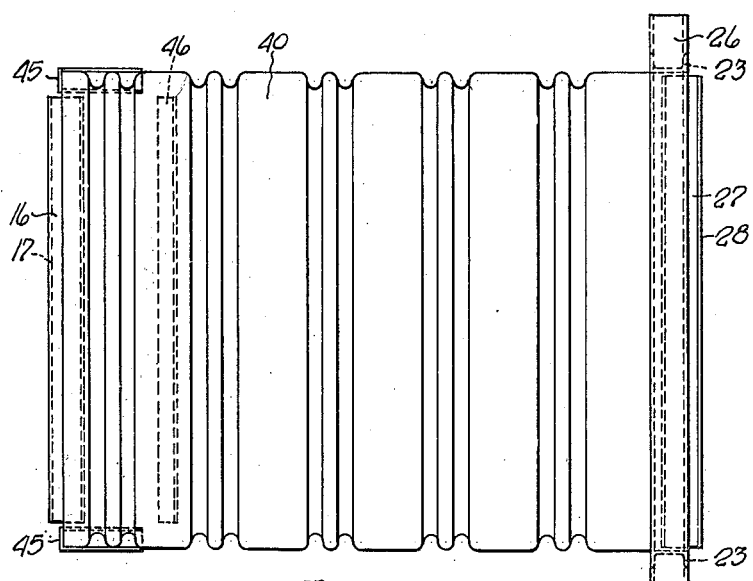
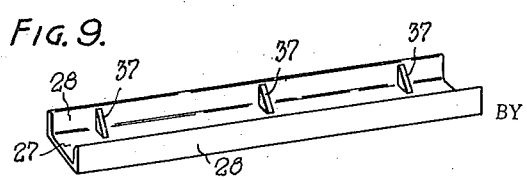
INVENTOR.
GERARD B. WHITE
BY Oltsch & Knoblock
Attorneys.

Patented Oct. 5, 1943

2,330,852

UNITED STATES PATENT OFFICE 2,330,852

PALLET

Gerard B. White, South Bend, Ind., assignor to Mastic Asphalt Corporation, South Bend, Ind., a corporation of Indiana Application April 28, 1941, Serial No. 390,661

24 Claims. (Cl. 211—49)

This invention relates to improvements in pallets, and more particularly to a pallet on which goods may be supported for storage and transportation or handling in factories and warehouses.

The primary object of the invention is to provide a pallet which may be compactly, firmly, and solidly stacked upon like pallets to any desired height without possibility of injury to or damage of the goods supported or carried thereby.

A further object is to provide a pallet provided with means for affecting an interlock thereof with like pallets on the same level in adjacent stacks, whereby the pallets of a plurality of stacks may be retained in predetermined relation to each other.

A further object is to provide a pallet with an upright frame at one end and complementary interlocking members at its opposite ends, whereby pallets in adjacent stacks at levels above the lower level are operatively supported at one end by superimposing of said upright frames and are supported at the other end by hooked or interlocking engagement of said interlocking members with a support or an interlocking member of an adjacent pallet.

A further object is to provide a pallet which is of novel, simple, and inexpensive construction.

A further object is to provide a pallet with means for interlocking engagement with a horizontal stringer on a vertical wall of a storage space, and with an inverted hook at the end opposite said first hook with which an adjacent horizontally aligned pallet may be interlocked, to interlock adjacent pallets in the same level in adjacent stacks.

A further object is to provide a pallet with means for precisely and accurately interlocking with like pallets at the same level said interlocking means including a guide for automatically positioning the interlocking parts in desired relation.

Other objects will be apparent from the description, drawing, and appended claims.

In the drawings:

Fig. 1 is a side elevation of a stack of pallets interlocked with each other and with a vertical building wall.

Fig. 5 is an enlarged fragmentary detail sectional view taken on line 5—5 of Fig. 4 and illustrating the manner in which adjacent panels interlock.

Fig. 6 is an end view of a modified embodiment of the invention.

Fig. 7 is a side view of the modified embodiment with parts shown in section.

Fig. 8 is a top plan view of the modified embodiment.

Fig. 9 is a perspective detail view.

Fig. 10 is a fragmentary side elevation of a modified embodiment of the invention.

Figure 2:
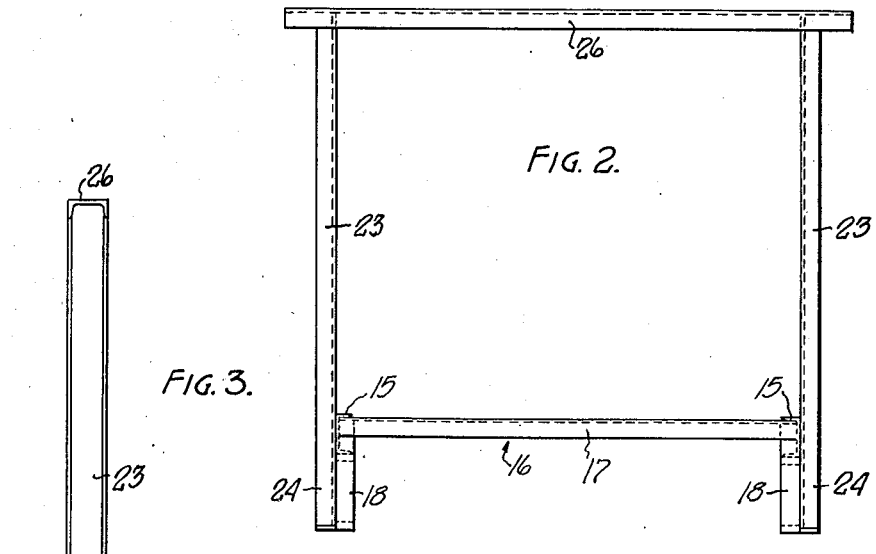
Fig. 2 is an end view of one of the pallets viewed from the right in Fig. 3.

Referring to the drawings, which illustrate a preferred embodiment of the invention, the numeral 10 designates the floor of a storage space, such as a warehouse or the like, and the numeral 11 illustrates one of the vertical walls defining said storage space. Wall 11 has a plurality of stringers 12 secured thereto. Stringers 12 extend horizontally and preferably constitute Z bars. One of the flanges of the Z bar is secured to the wall 11, and the opposite flange 13 thereof is offset from the first and projects upwardly in spaced relation to the wall. A plurality of the stringers 12 are provided, and these are arranged in equi-spaced relation, with the lowermost stringer 12 preferably spaced only a short distance above the floor 10.

Figure 3:
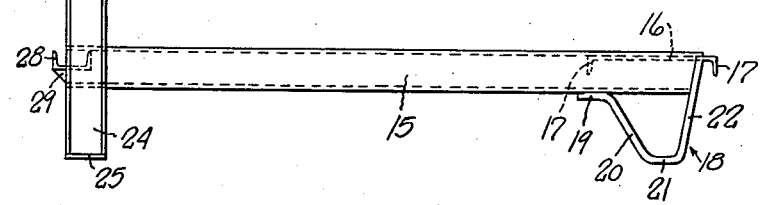
Fig. 3 is a view of a pallet in side elevation.
Figure 4:
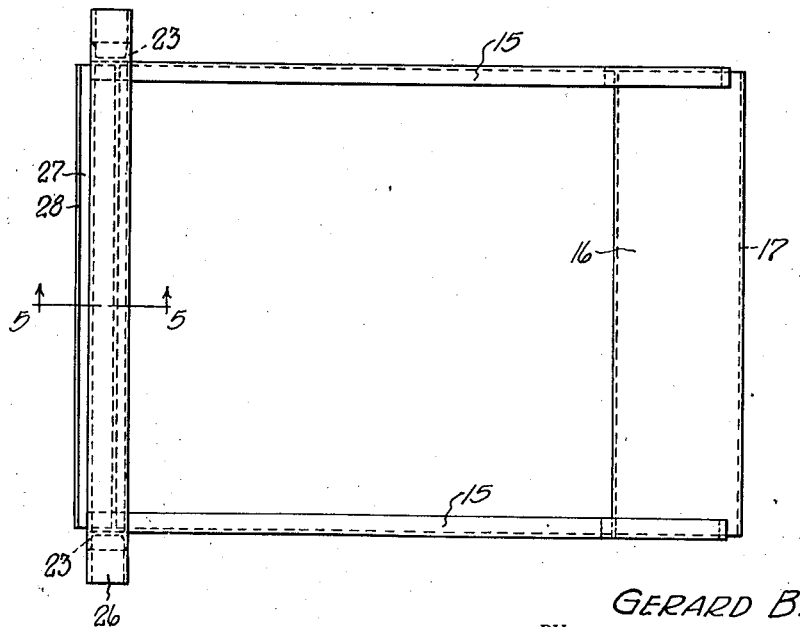
Fig. 4 is a top plan view of a pallet.

The construction of the individual pallets is preferably as illustrated in Figs. 2 to 5. As illustrated, each pallet has a pair of substantially horizontal side rails 15 which are positioned in spaced opposed parallel relation. Rails 15 preferably comprise metal channels. At one end, the channels 15 are interconnected by a transversely extending horizontal channel 16. Channel 16 has its web positioned uppermost, and the opposite legs 17 thereof depend from the web. Channel 16 is preferably secured to the channels 15 by welding, with its ends fitting within the contour of the channels 15 whose webs are outwardly positioned and whose channel legs extend inwardly from said webs. The outer side of channel 16 projects beyond the ends of channels 15, whereby the outer leg 17 thereof is spaced outwardly from the ends of said channels 15.

A substantially V-shaped foot portion 18 is secured to each channel 15 at the end thereof adjacent channel 16. Each of the foot portions is formed from rigid strap or flat bar material, and comprises a flange 19 bearing against and welded in face contact to the lower leg of the channel 15 in spaced relation to the end thereof. A downwardly and outwardly inclined portion 20 extends from portion 19, and a horizontal portion 21 spaced below the channel 15 and parallel thereto extends from portion 20 and constitutes the bearing portion of said foot. An upwardly rearwardly inclined portion 22 projects from portion 21 and is welded to the end edge of the channel 15.

A pair of upright channels 23 are secured to the side rails 15 at the ends of said rails opposite channel 16, with the webs of said channels 15 and 23 welded together back to back. The channels 15 are secured to the channels 23 intermediate the length of said channels 23, whereby the lower portion 24 of each channel 23 constitutes a leg or foot for the horizontal side rails 15 which is preferably slightly shorter than the foot 18, so that the side rails 15 are inclined at a very small angle to the horizontal. In the one embodiment of the invention, where the overall length of the rails 15 is about 50 inches, the height of the foot portion 24 is about ¼ of an inch less than the height of the foot portions 18. A suitable base plate 25 may be secured at the lower ends of the channels 23 for bearing purposes. A channel 26 is rigidly secured to and spans the upper ends of the channels 23. Channel 26 may be of greater length than the distance between the channels 23, whereby it projects laterally beyond said channels 23 at each end.

A channel 27 having its legs 28 extending upwardly therefrom, is secured between the side rails 15 at the ends thereof adjacent uprights 23. The channel 27 is so positioned that the upper surface of the web thereof will be in substantially the same horizontal plane as the terminal portions of the legs 17 of the channels 16 when the pallet is supported upon the foot portions 18 and 24. One side of channel 27 projects outwardly beyond the ends of said rails 15 for purposes to be hereinafter set forth. In order to reinforce the channel 27, a web 29 extending transversely thereof and resting upon the lower legs of the channels 15 forming the side rails 15 is positioned at each end of channel 27 and is welded thereto and to the lower legs of channel 15. Also, a pair of plates 30 are welded to each end of channel 27 and to the lower legs of adjacent channel 15. Plates 30 extend in a vertical direction and substantially parallel to the legs 28 of channel 27. This reinforcing construction is best illustrated in Fig. 5.

It will be understood that these pallets are adapted to support and carry packages or articles from place to place within a factory or a warehouse, as by means of industrial trucks provided with hoisting platforms upon which the pallets are supported. As illustrated in Fig. 1, each pallet may have a number of boxes, packages, or items stacked on the platform or carrier portion thereof. In instances where it is desired to store the packages or goods while awaiting shipment thereof, it is necessary either to unload the pallets in the warehouse in which the goods are to be stored, or to stack the pallets one upon the other in order to conserve storage space within a warehouse. The pallets now in common use cannot be effectively and solidly stacked to desired levels to support the goods when stacked in such a manner that the weight of the stack will not be applied to the goods. The instant pallet construction can be used in the manner aforesaid, and meets all problems heretofore experienced with stacking pallets. Thus, where goods are to be stored in a warehouse pending shipment, and it is desired to avoid the labor of unloading the pallets for stacking purposes and then reloading the same when the goods are to be shipped. the instant pallet serves effectively.

Referring to Fig. 1, it will be observed that the pallets may be stacked to any desired height and in any number of stacks in alignment and transverse to a given wall. Also, the adjacent pallets at the same level can be interlocked. For example, the lowermost pallet 31 is positioned upon the floor 10 adjacent the wall 11 with its hook forming channel leg 17 positioned behind the upwardly extending portion 13 of the lowermost stringer upon the wall. In this position, the full weight of the pallet is supported by the foot portions 18 and 24 thereof, with hook 17 serving merely to prevent movement of the pallet away from wall 11. Another pallet 32 may then be positioned directly upon the pallet 31 with its feet 24 bearing upon the upright end frame 23—26 of the pallet 31, and its hook 17 engaging with the inverted lip 13 of the next stringer 13. The entire weight of the pallet 32 is divided between the stringer 13 and the superimposed end frames 23, so that none of the weight of said pallet is applied to the packages mounted upon the pallet 31 therebelow. The pallets may be stacked to any desired height. As here shown, a pallet 33 is stacked upon pallet 32, and a pallet 34 is stacked upon pallet 33. For practical purposes, the only limit to the height to which the pallets may be stacked is the limit of the ability of the industrial truck to elevate a pallet. When one stack has been erected to its full height, a second stack may be begun. Thus, a pallet 35 is mounted upon the floor 10 in longitudinal alignment with pallet 34, with its hook 17 engaged with the inverted hook formed by the outer leg 28 of the channel 27 which constitutes a rigid retainer or receiver for hook 17, thereby serving to hold pallet 35 against separation from pallet 31. Thereupon, a second pallet 36 may be superimposed upon pallet 35 with the end frames 23 in superimposed end bearing relation to support one end of the pallet, while the hook 17 of pallet 36 engages the outer hook portion 27—28 of the pallet 32 to support and interlock pallet 36 relative to pallet 32. The formation of a row of stacks extending perpendicularly to the wall 11, wherein the pallets of each stack are secured or interlocked with the wall or with a pallet of an adjacent stack, assures a compact stacking arrangement and may be extended to any point necessary or desired. That is, the row of stacks may be of any length without increasing the stress applied to the stringers 13, or in any way mitigating against the effectiveness and strength of the construction, and the individual pallets. In other words, except at the superimposed end frames 23 no increment of weight or stress occurs in stacking to any height, and each interlock member 17, 28 and 13 must sustain only a part of the weight of a loaded pallet. Successive rows of stacks of pallets may likewise have each pallet thereof interconnected with some other pallet. Hence, the construction is one wherein the stacks are firm and there is no danger of their falling, even if accidentally struck.

It will be observed that the pallets are readily accessible and available when stacked, and may be removed from the stack by running the platform of a truck between the foot portions 24 thereof and under the platform or carrier of the pallet and then raising the pallet slightly to disengage the hooks 17—27, whereupon the pallet is free and may be transported upon the truck to any desired point. It will also be seen that the pallets need not be precisely positioned in superimposed position, but may be slightly staggered in a stack without danger of tipping of the stack. Such limited vertical mis-alignment of the pallets is accommodated by the length of channel 26 and its lateral extension beyond the sides of the pallet and by the elongated character of the interlocking members 17, 27—28, and of stringer 13. This permits the operator to avoid the necessity for painstaking care in stacking the pallets.

The form which the individual pallets may take may vary within a wide range and in accordance with the character of the particular material to be supported thereon. Thus, if desired, a plate or platform may be provided to extend across the tops of the side rails 15 to support small articles. Also, side walls may be provided to form a basket-like pallet if desired. These modifications are believed to be obvious and for this reason have not been illustrated. It is important to note, however, that in each such embodiment the space between the foot portions 24 of the end frames 23 below the side rails 15 must be free, so that the hoist platform of an industrial truck may be inserted therebetween and beneath the pallet for the purpose of operatively engaging the pallet. Likewise, if desired, it is possible to insert the platform of a truck beneath the side rails 15 and between the foot portions 18 and 24.

In order to insure accuracy of positioning of adjacent interlocked pallets, and to prevent occurrence of increments of misalignment in successive stacks in a long row which might amount to enough to prevent superimposing of end frames 23, it is desirable to provide a guide channel 27. One form of such guide is illustrated in Figs. 5 and 9 and constitutes a plurality of wedge shaped plates 37 welded or otherwise rigidly secured to the channel 27 and leg 28 in spaced relation. It will be observed that, as the hook 17 of one pallet is lowered into channel 27 of an adjacent pallet, said hook 17 will ride upon the inclined face of the guide plates 37 and will come to rest substantially in engagement with the ends of side rails 15. Hence, an accurate longitudinal relation or spacing of aligned pallets is obtained by the guides which will prevent occurrence of increments of variation in spacing ample to permit misalignment of end frames 23, without regard to the number of pallets in each horizontal row. Any other embodiment utilizing a V-shaped groove for receiving hook 17 of an adjacent pallet may be employed, as will be obvious.

A modified embodiment of the invention is illustrated in Figs. 6 to 8. In this embodiment a sheet metal plate, transversely corrugated for strength, is bent in inverted U-shape to provide a platform 40 and depending sides 41. The sides are cut away at 42 to provide feet 43—44 at opposite ends thereof. Feet 43 preferably have their outer lower edges cut in curved form, and a channel iron is bent longitudinally in conformity with the curvature of the edge of each of said feet 43 and is welded or otherwise secured thereto forming a runner 45. A transverse angle iron 46 is welded to the under face of platform 40 adjacent the end thereof provided with feet 43, and provides a rigid support for engagement with the hoisting platform of an industrial truck. The remaining parts of this embodiment of the invention correspond with like parts of the preferred embodiment of the invention. Thus, upright channels 23 have foot portions 24 thereof welded to feet 44, and the upper ends thereof are spanned by channel 26. Channel 27 is welded between foot portions 44 with one of its upwardly extending channel legs 28 projecting beyond the end of platform 40. And channel 16 has its web welded to the bottom face of platform 40 at the end thereof opposite channel 27, with its outer flange 17 extending downwardly in outwardly spaced relation to the end of the platform.

This embodiment of the invention may be used in exactly the same way as the preferred embodiment, as above outlined. It is of substantially the same strength and rigidity as the preferred embodiment, and possesses the advantage of lower cost due to its partial formation from sheet metal, and also the advantage of including a platform and of reduction in the number of parts constituting the same, as compared to a platform type of pallet constructed in the manner of the previously described embodiment.

While each of the embodiments illustrated herein show the upright end frame 23—26 as rigid with relation to the remaining parts of the pallet, it will be understood that the same may be hinged at 50 at or slightly above the rails 15 of the one embodiment as illustrated in Fig. 10 or of the platform 40 in the other embodiment so as to permit it to lie flat and in substantially parallel relation upon said said rails or platform. Such a hinge construction will accommodate compact storage of the pallets in a collapsed condition when not in use. Locking means 51 may be used to hold the hinged parts in operative upright position if desired, although this is not essential.

I claim:

1. A pallet comprising a vertical end frame, a substantially horizontal article support secured at one end to said frame intermediate the height of said frame, supporting means below the opposite end of said article support, a rigid downwardly extending hook projecting from the end of said article support adjacent said supporting means, and a rigid hook receiver carried by the other end of said support and adapted for hooked engagement with the hook of a complementary pallet.

2. A pallet comprising a substantially horizontal article support, legs mounting said support, an upright frame aligned with an least one leg, and a pair of rigid opposed hooks projecting from the opposite ends of said article support, opposed hooks of adjacent horizontally aligned pallets being turned toward each other and adapted for superimposed interlocking engagement.

3. A pallet comprising a substantially horizontal article carrier having a retainer at one end, a plurality of feet supporting said carrier adjacent said retainer, an upright frame extending above said carrier in alignment with at least one of said feet, and a rigid hook projecting from the other end of said carrier and adapted for interlocking engagement with the retainer of a juxtaposed pallet.

4. A pallet as defined in claim 3, wherein said retainer constitutes an inverted rigid hook projecting from the end of said carrier, said first named hook of one pallet being adapted for supported engagement with the last named hook of an adjacent pallet.

5. A pallet comprising a footed article carrier, a rigid upright member projecting upwardly from said carrier above at least one foot thereof, and a pair of oppositely faced rigid hooks projecting from opposite ends of said carrier at substantially the same elevation, the hook adjacent said upright being upturned to support and interlock with the opposite hook of an adjacent pallet.

6. A pallet comprising an article carrier, means for supporting said carrier in elevated position, a rigid up right extending above said carrier in alignment with the supporting means at one end of said carrier, a rigid projection at each end of said carrier, a downwardly extending rigid lip carried by the outer end of one projection and an upwardly extending rigid lip carried by the outer end of the projection adjacent said upright, said lips being positioned at substantially the same elevation.

7. A pallet comprising a substantially horizontal platform, a pair of feet supporting one end of said platform, a rigid transverse upright frame secured at an intermediate portion thereof to the other end of said platform, and a rigid transverse hook carried by the end of said platform adjacent said feet and including a rigid depending terminal portion, said platform having a transverse hook retainer adjacent said upright.

8. A pallet comprising a pair of spaced parallel substantially horizontal rails, a channel member interconnecting said rails at one end thereof and projecting outwardly therefrom, said channel having its web uppermost and its legs extending downwardly from said web, a second channel interconnecting said rails at the other end thereof and projecting outwardly therefrom, said second channel having its web in substantially the horizontal plane of the lower ends of the legs of said first channel and its legs extending upwardly from said web, an upright frame secured to said rails adjacent said second channel, said frame extending above and below said rails, and means adjacent said first channel for supporting said rails.

9. The combination with a storage space defined in part by a vertical wall, of a plurality of spaced horizontal rigid stringers secured to said wall and including a rigid hook member, having an upwardly projecting terminal portion, a plurality of pallets each including an article support and an upright end frame, and a rigid hook having a downwardly extending terminal portion projecting from the end of said articles support opposite said end frame, said end frames being of a height equal to the spacing between centers of said stringers, the first stringer being at a height to cooperate with the hook on the end of the article support, whereby said pallets may be stacked with said end frames in superimposed relation and said hooks engaging said stringers.

10. The combination defined in claim 9, wherein said pallets each have a rigid hook member projecting from the end thereof adjacent said upright end frame, said last-named hook members having upwardly extending terminal portions.

11. The combination with a storage space defined in part by a vertical wall, of a plurality of vertically spaced horizontal supports carried by said wall, a plurality of juxtaposed stacks of pallets, each of said pallets having oppositely arranged projecting connectors at opposite ends thereof, the pallets of the stack adjacent said wall being secured thereto by engagement of said connectors with said supports and the pallets of the remaining stacks being interlocked with the adjacent pallets of said first and adjacent stacks by interengagement of said connectors.

12. A pallet as defined in claim 5, and a vertically inclined guide portion on one of said interengaging hooks and engageable by the other hook for accurately positioning said hooks transversely thereof.

13. A pallet comprising a sheet of transversely corrugated metal bent in U-shape to provide a platform and opposed supporting portions, a rigid upright member projecting upwardly from one end of said carrier and adapted to support the supporting portions at one end of a superimposed pallet, and a pair of oppositely facing rigid hooks projecting from opposite ends of said platform, at approximately the same elevation and each adapted to interengage with the opposite hook of an adjacent pallet.

14. A pallet as defined in claim 13, and curved rigid members secured to one end of said supporting portion to form runners.

15. A pallet as defined in claim 13, and a transverse rigid member secured to the lower face of said platform intermediate the ends thereof to form a bearing member adapted to be engaged by the hoist platform of an industrial truck.

16. A stacking pallet comprising a substantially horizontal article carrier, means for supporting said carrier in elevated position, a rigid transverse upright frame extending above said carrier and vertically aligned with the supporting means at one end of said carrier to sustain the supporting means at one end of another pallet stacked thereon, and a rigid transverse member projecting from the opposite end of said carrier and adapted to bear upon means on the carrier of another pallet adjacent its upright.

17. A stacking pallet comprising a substantially horizontal article carrier, means for supporting said carrier in elevated position, a rigid transverse upright frame extending above said carrier and vertically aligned with the supporting means at one end of said carrier to sustain the supporting means at one end of another pallet stacked thereon, and a rigid transverse member projecting from the opposite end of said carrier and adapted to bear upon means on the carrier of another pallet adjacent its upright, and means adapted to interlock said pallet with an adjacent pallet to prevent endwise dislocation of adjacent pallets.

18. In combination, a plurality of pallets arranged in juxtaposed aligned stacks, each pallet including an article carrier, an upright frame adjacent one end of said carrier and a rigid member projecting from the end of said carrier opposite said upright, the uprights of the pallets of each stack being arranged in vertical alignment, and supporting means engaged by the projecting member of one end pallet at each stack level, the projecting members of the remaining pallets at each level bearing upon means on the carrier of a juxtaposed pallet adjacent the upright thereof.

19. In combination, a plurality of pallets arranged in juxtaposed aligned stacks, each pallet including an article carrier, an upright frame adjacent one end of said carrier and a rigid member projecting from the end of said carrier opposite said upright, the uprights of the pallets of each stack being arranged in vertical alignment, and supporting means engaged by the projecting member of one end pallet at each stack level, the projecting members of the remaining pallets at each level bearing upon means on the carrier of a juxtaposed pallet adjacent the upright thereof, and interlocking means on each pallet engageable with an adjacent pallet to hold the pallets at each level in juxtaposed relation.

20. A stacking pallet comprising an article carrier, a rigid retainer at one end of said carrier, a rigid upright secured to said carrier adjacent said retainer and adapted to support a portion of a like superimposed pallet, and an interlock member at the other end of said carrier and adapted to be received in and supported by the retainer of an adjacent pallet.

21. A stacking pallet comprising an article carrier, a transverse retainer at one end of said carrier, a transverse upright frame projecting above said carrier adjacent said retainer and adapted to support a portion of a like superimposed pallet, and a transverse member projecting from the opposite end of said carrier adapted to bear on the retainer of an adjacent pallet.

22. A pallet comprising a substantially horizontal platform, a pair of feet supporting one end of said platform, a rigid transverse upright frame secured at an intermediate portion thereof to the other end of said platform, and a rigid transverse hook including a rigid depending terminal portion secured to said first end of the platform, said platform having a transverse hook retainer adjacent said upright, said retainer including a horizontal base portion in substantially the horizontal plane of the lower edge of said terminal portion, and an upwardly extending portion at the outer end of said base portion.

23. A stacking pallet as defined in claim 20, wherein said upright is pivoted to said carrier to permit said upright to be positioned substantially horizontally upon said carrier.

24. A stacking pallet as defined in claim 20, wherein said upright is pivoted to said carrier and adapted to lie thereon, and means for locking said upright in vertical position.

GERARD B. WHITE.